United States Patent
Veltel et al.

(10) Patent No.: US 10,730,218 B2
(45) Date of Patent: Aug. 4, 2020

(54) PELLETIZING SYSTEM

(71) Applicant: MAAG AUTOMATIK GMBH, Grossostheim (DE)

(72) Inventors: Juergen Veltel, Kevelaer (DE); Matthias Berrendorf, Xanten (DE)

(73) Assignee: MAAG AUTOMATIK GMBH, Grossostheim (DE)

( * ) Notice: Subject to any disclaimer, the term of this patent is extended or adjusted under 35 U.S.C. 154(b) by 334 days.

(21) Appl. No.: 15/660,413

(22) Filed: Jul. 26, 2017

(65) Prior Publication Data
US 2018/0104877 A1 Apr. 19, 2018

(30) Foreign Application Priority Data
Oct. 17, 2016 (DE) .................. 20 2016 006 419 U

(51) Int. Cl.
| | |
|---|---|
| *B29C 48/12* | (2019.01) |
| *B29C 48/00* | (2019.01) |
| *B29C 48/04* | (2019.01) |
| *B29C 48/025* | (2019.01) |
| *B29C 48/265* | (2019.01) |
| *B29C 48/25* | (2019.01) |
| *B29B 9/06* | (2006.01) |

(Continued)

(52) U.S. Cl.
CPC ............ *B29C 48/0022* (2019.02); *B29B 9/06* (2013.01); *B29B 9/065* (2013.01); *B29C 48/025* (2019.02); *B29C 48/04* (2019.02); *B29C 48/265* (2019.02); *B29C 48/266* (2019.02); *B01J 2/20* (2013.01); *B29C 48/05* (2019.02); *B29C 48/256* (2019.02); *B29C 48/30* (2019.02); *B29C 48/345* (2019.02); *B29K 2023/06* (2013.01); *B29K 2023/12* (2013.01)

(58) Field of Classification Search
CPC . B29C 48/0022; B29C 48/025; B29C 48/266; B29C 48/04; B29C 48/265; B01J 2/20; B29K 2023/06; B29K 2023/12
USPC .......................................................... 425/200
See application file for complete search history.

(56) References Cited

U.S. PATENT DOCUMENTS

| | | |
|---|---|---|
| 5,723,082 A | 3/1998 | Mizuguchi et al. |
| 2005/0202114 A1* | 9/2005 | Chszaniecki ........... B29C 48/04 425/308 |
| 2012/0164255 A1* | 6/2012 | Dahlheimer .............. B29B 9/06 425/67 |

FOREIGN PATENT DOCUMENTS

| | | |
|---|---|---|
| CN | 1049381 | 2/2000 |
| CN | 1571717 | 1/2005 |

(Continued)

*Primary Examiner* — Joseph S Del Sole
*Assistant Examiner* — Lawrence D. Hohenbrink, Jr.
(74) *Attorney, Agent, or Firm* — Jacobson Holman, PLLC.

(57) ABSTRACT

A pelletizing system including a supporting rail, a pelletizer that is suspended from the supporting rail, a suspension base, a supporting arm, and an articulated arm. The supporting arm is supported at a first end on the suspension base by means of a first swivel joint and is hinged to the supporting rail at a second end by means of a second swivel joint. The articulated arm includes a first articulated arm branch which is connected to a second articulated arm branch by a third swivel joint. The first articulated arm branch is supported on the suspension base by means of a fourth swivel joint, and the second articulated arm branch is hinged to the supporting rail by means of a fifth swivel joint. In an embodiment, the first through fifth swivel joints each have an essentially vertical swivel axis.

17 Claims, 2 Drawing Sheets

(51) Int. Cl.
*B29C 48/345* (2019.01)
*B29C 48/30* (2019.01)
*B29C 48/05* (2019.01)
*B01J 2/20* (2006.01)
*B29K 23/00* (2006.01)

(56) References Cited

FOREIGN PATENT DOCUMENTS

| | | |
|---|---|---|
| CN | 1748853 | 3/2006 |
| DE | 69414317 | 6/1999 |
| DE | 19920601 | 11/2000 |
| DE | 10151434 | 4/2003 |
| DE | 10234229 | 2/2004 |
| DE | 102008037011 | 2/2010 |
| DE | 202007019511 | 3/2013 |
| EP | 0531966 | 3/1993 |
| EP | 2385006 | 11/2011 |
| JP | S59109307 | 6/1984 |
| JP | H04267108 | 9/1992 |
| WO | WO2011/005528 | 1/2011 |

\* cited by examiner

PELLETIZING SYSTEM

BACKGROUND OF THE INVENTION

1. Field of the Invention

The present innovation concerns a pelletizing system.

2. Description of the Related Art

In order to produce pellets from thermoplastic material, in particular polymers such as, e.g., polyethylene or polypropylene, underwater pelletizing systems are oftentimes used, in which strands are first formed from the thermoplastic material, and the strands are then reduced to pellets by pelletizers. Corresponding systems are known, as for example the Sphero underwater pelletizing system from Automatik Plastics Machinery.

In this context, extrusion systems such as, e.g., screw extruders, are primarily employed, by means of which a downstream pelletizer is continuously and uniformly supplied with plastic melt. Depending on requirements, additional components such as a gear pump, a melt filter, and/or a start-up valve may also be located between the extrusion system and the pelletizer.

The pelletizer itself can consist in a known manner of a die plate unit, a process chamber, and a cutter head unit, and can in particular be designed as an underwater pelletizer or as an air-cooled die-face pelletizer.

For maintenance and cleaning of the various components, as for example at a change in material, it is routinely necessary to separate and disconnect the components from one another, and to connect them to one another again after cleaning. In particular, it is frequently necessary to separate and disconnect the cutter head and the die plate of the pelletizer from one another, for example in order to be able to replace the blades of the cutter head. To be able to accomplish this separation in a simple way, it is known to movably suspend the cutter head and the die plate unit of the pelletizer from a supporting rail, for example by providing for each of them a suspension device, with a roller arrangement, that runs on a running surface formed on the supporting rail and that can be moved in a longitudinal direction of the supporting rail.

Moreover, in some applications it is also necessary to separate the pelletizer, and if applicable the upstream components such as a start-up valve, melt pump, and/or melt valve, from a first extrusion system, and to connect them to a second extrusion system located to the side of the first extrusion system. This may be necessary in applications in which different thermoplastic materials are to be processed and pelletized, in particular. In this case, an ability to move the pelletizer only in the longitudinal direction along the supporting rail is not sufficient to be able to establish a necessary lateral offset. Provision has variously been made therefore to mount the supporting rail on a three- or four-legged gantry whose legs have rollers so that, for example, an operator can move the gantry, and thus the position of the supporting rail. This is known for the Sphero underwater pelletizing system from Automatik Plastics Machinery as well, for example.

However, a gantry construction of this nature suffers from the disadvantage that the gantry legs can be in the way for access to the system, in addition to the relatively high material cost required for construction of the gantry.

SUMMARY OF THE INVENTION

It is therefore an object of the present invention to propose a pelletizing system with which movability of the pelletizer in both the longitudinal direction and the lateral direction is made possible in an economical and structurally simple manner.

This object is attained according to the present invention by a pelletizing system that has a supporting rail, a pelletizer that is suspended from the supporting rail, a suspension base, a supporting arm that is supported at a first end on the suspension base by means of a first swivel joint and is hinged to the supporting rail at a second end by means of a second swivel joint, and an articulated arm. The articulated arm includes a first articulated arm, which is connected to a second articulated arm by a third swivel joint, wherein the first articulated arm is supported on the suspension base by means of a fourth swivel joint, and the second articulated arm is hinged to the supporting rail by means of a fifth swivel joint, wherein the first through fifth swivel joints each have an essentially vertical swivel axis. According to preferred embodiments, the first swivel joint and the fourth swivel joint have the same swivel axis; and/or the pelletizer is arranged so as to be movable in a longitudinal direction of the supporting rail; and/or the suspension base is attached to a housing, in particular a control cabinet housing or a housing for an ancillary component of the pelletizing system, or is implemented as a single part therewith. According to other preferred embodiments, the pelletizer is implemented as an underwater pelletizer or an air-cooled die-face pelletizer; and/or the pelletizer comprises a die plate unit and a cutter head unit, which are detachably connected and separately suspended from the supporting rail; and/or the pelletizing system additionally comprises at least one extrusion system.

By pivoting the supporting arm and the articulated arm, or its branch members, in different ways, it is thus possible to move the supporting rail in the lateral and longitudinal directions in an essentially horizontal plane, and rotate it through an angle. In this way, a pelletizer can be moved in a simple manner between a position for connection to a first extrusion system and a position for connection to a second extrusion system, for example. This movability can be combined with a movability of the pelletizer in the longitudinal direction relative to the supporting rail to especially good advantage.

Provision can be made in this design that the supporting arm and the articulated arm are linked to the suspension base at two different points. Alternatively, it is equally possible for the supporting arm and the articulated arm to be linked to the suspension base such that they are pivoted about the same swivel axis.

The suspension base can be composed of, e.g., a dedicated structural element, as for example a supporting column. Preferably, however, the suspension base is attached to a different component of the pelletizing system or is implemented as a single part therewith, as for example a control cabinet or a housing for an ancillary component. An especially space-saving and material-saving construction can be made possible in this way.

The pelletizer can in particular be implemented as an underwater pelletizer or an air-cooled die-face pelletizer, and can in particular comprise a die plate unit and a cutter head unit, which preferably are detachably connected and separately suspended from the supporting rail.

BRIEF DESCRIPTION OF THE DRAWING

The invention is described in greater detail below with reference to the drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
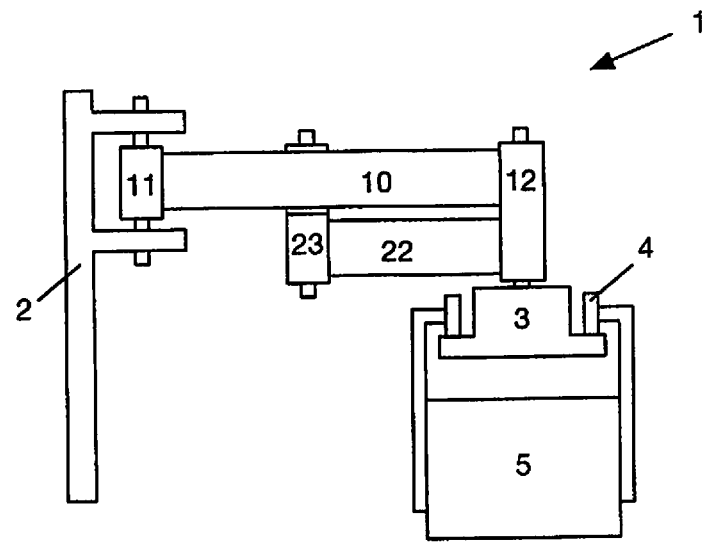
FIGS. 1 to 3 schematically show a pelletizing system in a side view, top view, and front view.
Figure 2:
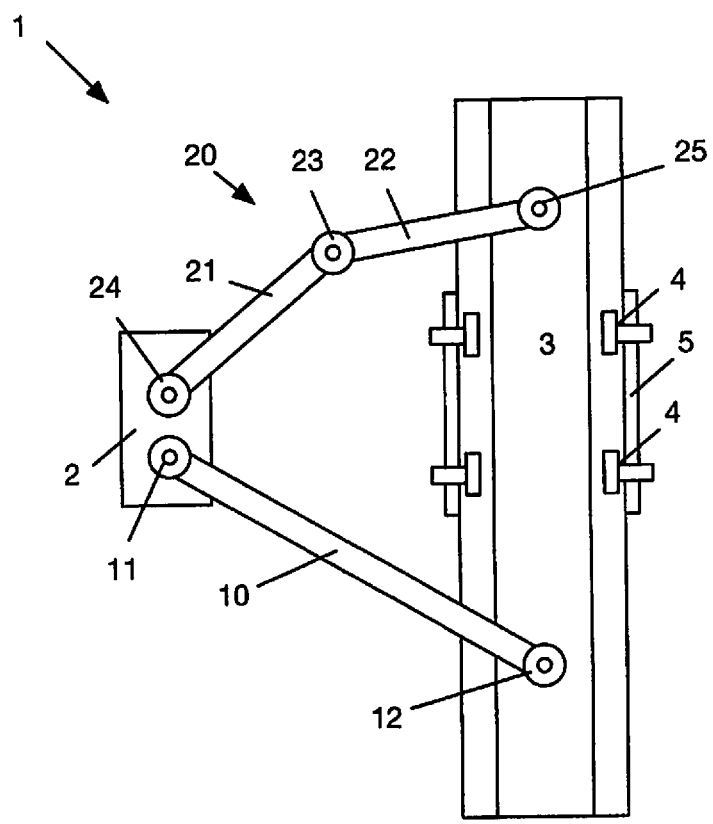
Figure 3:
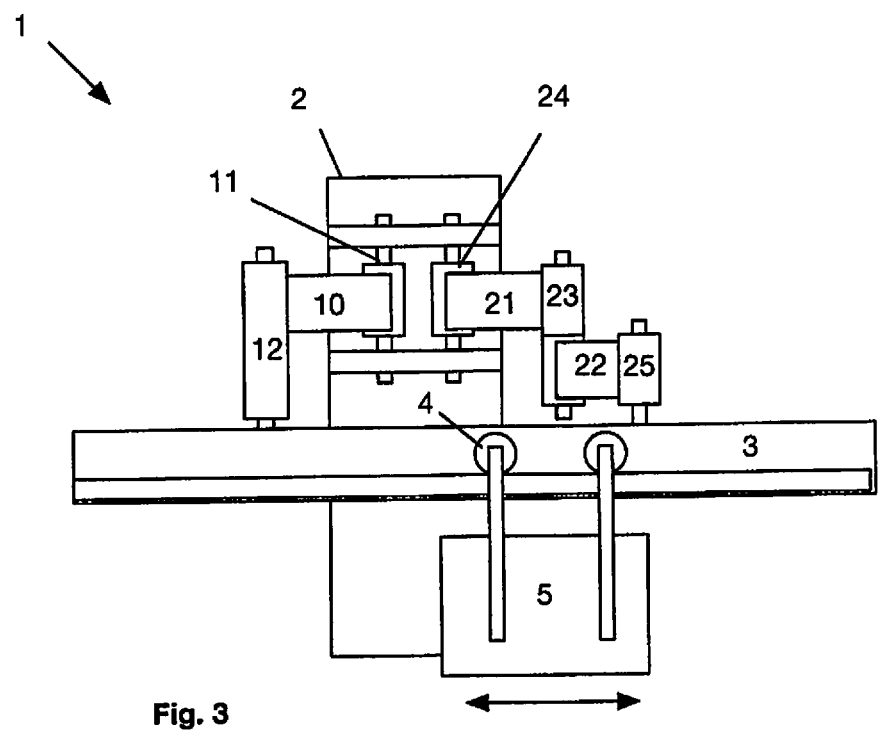

Schematically shown in FIGS. 1 to 3 is a pelletizing system 1 in which a pelletizer 5 is suspended from a supporting rail 3, for example by means of rollers 4, so that the pelletizer 3 can be moved in the longitudinal direction of the supporting rail.

The supporting rail 3, in turn, is attached to a suspension base 2 through a supporting arm 10 and an articulated arm 20. More precisely, the supporting arm 10 is supported at a first end on the suspension base 2 by means of a first swivel joint 11, and is hinged to the supporting rail 3 at a second end by means of a second swivel joint 12. The articulated arm 20 is composed of a first articulated arm branch 21, which is connected to a second articulated arm branch 22 by a third swivel joint 2. The first articulated arm branch 21 is supported on the suspension base 2 by means of a fourth swivel joint 24, and the second articulated arm branch 22 is hinged to the supporting rail 3 by means of a fifth swivel joint 25. The supporting arm 10 and the articulated arm branches 21, 22 of the articulated arm 20 can thus be pivoted relative to one another in an essentially horizontal plane, with the result that the supporting rail can be displaced in the horizontal plane, for example can be moved closer to the suspension base 2 and farther away from it.

Figure 4:
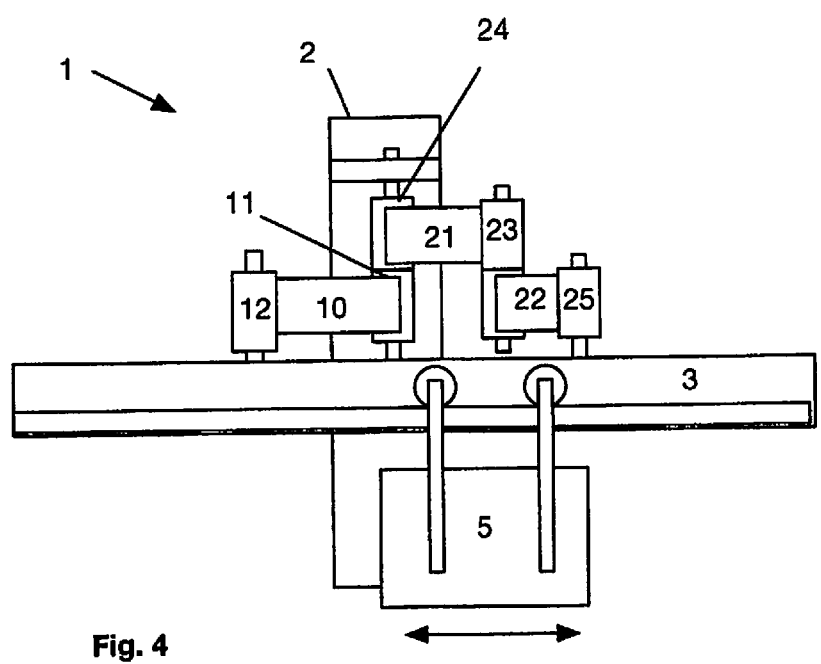
FIG. 4 schematically shows a front view of an exemplary embodiment in which a supporting arm and an articulated arm are linked to a suspension base such that they rotate about the same swivel axis.

FIGS. 1 to 3 show an exemplary embodiment in which the supporting arm 10 and the articulated arm 20 are located on separate swivel joints 11, 24 that are offset laterally from one another. Alternatively, however, it is also possible to implement the swivel joints 11, 24 as shown in FIG. 4 such that they share the same swivel axis.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

REFERENCE CHARACTERS 1 pelletizing system
2 suspension base
3 supporting rail
4 rollers
5 pelletizer
10 supporting arm
20 articulated arm
21 first articulated arm branch
22 second articulated arm branch
11, 12, 23, 24, 25 swivel joints

The invention claimed is:

1. Pelletizing system, comprising:
   a supporting rail;
   a pelletizer that is suspended from the supporting rail;
   a suspension base;
   a supporting arm that is supported at a first end on the suspension base by means of a first swivel joint and is hinged to the supporting rail at a second end by means of a second swivel joint; and
   an articulated arm with a first articulated arm branch which is connected to a second articulated arm branch by a third swivel joint, wherein the first articulated arm branch is supported on the suspension base by means of a fourth swivel joint, and the second articulated arm branch is hinged to the supporting rail by means of a fifth swivel joint,
   wherein the first through fifth swivel joints each have an essentially vertical swivel axis.

2. The pelletizing system according to claim 1, wherein the first swivel joint and the fourth swivel joint have a same swivel axis.

3. The pelletizing system according to claim 1, wherein the pelletizer is arranged so as to be movable in a longitudinal direction of the supporting rail.

4. The pelletizing system according to claim 1, wherein the suspension base is attached to a housing of the pelletizing system, or is implemented as a single part therewith.

5. The pelletizing system according to claim 1, wherein the pelletizer is implemented as an underwater pelletizer or an air-cooled die-face pelletizer.

6. The pelletizing system according to claim 1, wherein the pelletizer includes a die plate unit and a cutter head unit, which are detachably connected and separately suspended from the supporting rail.

7. The pelletizing system according to claim 1, additionally comprising at least one extrusion system.

8. The pelletizing system according to claim 4, wherein the housing is a control cabinet housing or a housing for an ancillary component of the pelletizing system.

9. A pelletizing system, comprising:
   a supporting rail;
   a pelletizer that is suspended from the supporting rail;
   a suspension base;
   a supporting arm that is supported at a first end on the suspension base by a first swivel joint and is hinged to the supporting rail at a second end by a second swivel joint; and
   an articulated arm with a first articulated arm branch which is connected to a second articulated arm branch by a third swivel joint, the first articulated arm branch being supported on the suspension base by a fourth swivel joint, and the second articulated arm branch being hinged to the supporting rail by a fifth swivel joint.

10. The pelletizing system according to claim 9, wherein the first swivel joint and the fourth swivel joint have a same swivel axis.

11. The pelletizing system according to claim 9, wherein the pelletizer is arranged so as to be movable in a longitudinal direction of the supporting rail.

12. The pelletizing system according to claim 9, wherein the first through fifth swivel joints each have an essentially vertical swivel axis.

13. The pelletizing system according to claim 9, wherein the suspension base is attached to a housing of the pelletizing system, or is implemented as a single part therewith.

14. The pelletizing system according to claim 13, wherein the housing is a control cabinet housing or a housing for an ancillary component of the pelletizing system.

15. The pelletizing system according to claim 9, wherein the pelletizer is implemented as an underwater pelletizer or an air-cooled die-face pelletizer.

16. The pelletizing system according to claim 9, wherein the pelletizer includes a die plate unit and a cutter head unit, which are detachably connected and separately suspended from the supporting rail.

17. The pelletizing system according to claim 9, additionally comprising at least one extrusion system.

* * * * *